Patented June 28, 1932

1,864,838

UNITED STATES PATENT OFFICE

HERBERT LANGWELL, OF EPSOM, ENGLAND, AND ELOI RICARD, OF MELLE, FRANCE, ASSIGNORS TO COMMERCIAL SOLVENTS CORPORATION, OF TERRE HAUTE, INDIANA, A CORPORATION OF MARYLAND

FERMENTATION OF CELLULOSIC MATERIALS

No Drawing. Application filed November 22, 1926, Serial No. 150,139, and in Great Britain November 26, 1925.

This invention relates to the fermentation of cellulosic materials. More particularly, it relates to improvements in the processes disclosed in British Patents Nos. 134,265; 161,294; and 248,795.

According to the above-mentioned patents and their corresponding equivalents, United States Letters Patent Nos. 1,443,881; 1,639,571; and 1,602,306, the fermentation of cellulosic materials has been carried out substantially as follows: Cellulosic material in some form, as for example, corncobs, is ground or reduced to a meal or other suitable form. This material is then added in sufficient quantity to water to give a mash containing, say, 6% concentration by weight of cellulosic material. To this mash is then added suitable amounts of the particular nutrient materials necessary to give active growth of the bacteria. This mash is then inoculated with thermophilic bacteria which produce acetic and butyric acids, ethyl alcohol, gases such as carbon dioxide, methane and hydrogen, and other useful products. These organisms are ordinarily found in almost any form of fermenting vegetable matter, stable manure, pond mud, septic sewage, tank mud, soil, etc. They are also usually found in the intestinal tracts of cellulose-consuming animals, and accordingly a convenient form of inoculum is obtained by selecting material from the center of a steaming stable manure heap or from such other source as is most convenient or suitable. From 1% to 5% of horse manure which has become heated by auto-fermentation may be suitably employed as the inoculum. Or, if desired, instead of using animal manure as the source of the thermophilic bacteria, the mash may be allowed to be fermented spontaneously by the thermophilic bacteria naturally present on the corncob meal.

On allowing the mash prepared and inoculated as above-described to ferment at temperatures between about 50° C. and about 70° C., preferably at about 60° C., acetic and butyric acids, ethyl alcohol, hydrogen, methane, carbon dioxide and other useful products are formed. As the fermentation proceeds and the amount of free acids in the mash increases, the activity of the bacteria becomes less and hence in order to obtain complete fermentation and generally optimal results it is necessary to maintain the acidity of the mash within certain limits. It has been found that the organisms effect this fermentation function best when the hydrogen ion concentration of the fermenting mash is maintained between the limits of about pH 9 and pH 5. As disclosed in United States Patent 1,602,306, by H. Langwell, this optimal hydrogen ion concentration may be maintained by the employment of (a) oxides, hydroxides, carbonates, or bicarbonates of alkali metals including ammonium, or (b) oxides, hydroxides, carbonates or bicarbonates of alkaline earth metals including magnesium, in which cases compounds of alkali metal which cause the formation of insoluble alkaline earth metal compounds, are added from time to time. It is preferred to follow the procedure outlined under (a); in which case, it is necessary to make small additions of the neutralizing agent such as, for example, soda ash, ammonium hydroxide, etc., thruout the fermentation. Whatever method is resorted to, the mash should be agitated at frequent intervals or at least after each addition of neutralizing agent.

If the hydrogen ion concentration is regulated by the procedure outlined under (b), it is found that after the fermentation has taken place for some time the fermentation tends to become slower owing to the soluble calcium salts which are produced by the neutralizaton of the acid bodies resulting from the fermentation. Before this point is arrived at the soluble calcium salts which are the inhibiting bodies must be precipitated, preferably by the addition of suitable quantities of sodium or other alkali metal salts giving rise to the formation of insoluble calcium compounds. It is preferred to make use of sodium sulphate or sodium carbonate for this purpose. From time to time similar additions of alkali metal salts are made in order to keep the hydrogen ion concentration between the required limits and to keep the amount of calcium salts in solution sufficiently low to permit the fermentation to proceed actively. The concentration of calcium salts which brings about inhibition varies with the materals and conditions of working.

We have now made the discovery that the inorganic nutrient materials previously employed in the fermentation of cellulosic materials by the aid of thermophilic bacteria may be substituted wholly or in part by waste liquors or residues from fermentation processes such as those obtained in the producton of ethyl alcohol, butyl alcohol, acetone, butyric acid, lactic acid and the like. This discovery permits important economic as well as other advantages in carrying out the fermentation process. The amounts of these materials necessary for satisfactory results naturally depend to some extent upon the character and source of waste fermentation liquors employed since the latter vary considerably with their source. That from the butyl-acetonic fermentation process may contain say a total of 1.6 gram of soluble and insoluble material when the mash has been made up from corn. This material in the waste distillery slop consists of soluble starch, dextrine, maltose, amino acids, peptides, peptone bodies, etc. Waste materials from other fermentation processes usually differ somewhat from that just described both in amount and composition. Regardless of minor variations, however, we have found that distillery wastes in general may be satisfactorily employed as nutrients when fermenting cellulosic materials with thermophilic bacteria of the type hereinabove referred to as well as in other processes employing thermophilic bacteria.

The amount of a particular kind of waste fermentation product employed as a nutrient may vary according to particular circumstances. In the examples cited below as illustrations of our improved process the mash was made up and the fermentation carried out substantially as previously described, the concentration of dry cobs being in each case approximately 6.3%, the temperature about 60° C., and the time of fermentation seven days.

Example (a) shows results obtained when fermenting cellulosic material with the aid of inorganic nutrients. In Example (b), waste liquor from a fermentation process, namely, malt corn mash waste, is substituted completely for the inorganic nutrients used in Example (a). In Examples (c) and (d), both inorganic nutrients and waste fermentation liquors are employed. Example (d) illustrates the use of still another form of waste fermentation liquor, which may be completely substituted for the inorganic nutrients used in Example (a), namely, butyl-acetonic fermentation slop.

*Examples*

```
                                                      Grams
(a) Corn cobs with standard additions of nutrients:
      Products per liter calculated as cellulose_  20–24
      Acetic acid yield as percentage of dry cobs_  20.2
      Butyric acid yield as percentage of dry
        cobs_____       2.0
      Alcohol yield as percentage of dry cobs__     6.4
      *Cellulose equivalent as percentage of dry
        cobs_____      33.9
```
*The percentage cellulose equivalent calculated on the dry cobs is equal to the cellulose equivalent in grams per liter divided by the weight of the cobs in grams per liter.

The standard addition of nutrients referred to above is a total addition of nutrients to 180 liters of mash in five equal daily parts, each daily addition comprising:

```
                                                      Grams
Ammonium sulfate_____        100
Potassium sulfate_____         50
Crystalline disodium phosphate_____         25

(b) Corn cobs without inorganic nutrients but with
      malt corn mash waste in place of water
      Products per liter calculated as cellulose__  33.3
      Acetic acid yield as percentage of dry cobs_  21.2
      Butyric acid yield as percentage of dry cobs_  3.1
      Alcohol yield as percentage of dry cobs__    14.8
      Cellulose equivalent as percentage of dry
        cobs_____      50.8

(c) Corn cobs with sodium phosphate as nutrient
      with malt corn mash waste in place of water
      Products per liter calculated as cellulose___ 33.4
      Acetic acid yield as percentage of dry cobs_  20.9
      Butyric acid yield as percentage of dry cobs_  6.4
      Alcohol yield as percentage of dry cobs____  12.9
      Cellulose equivalent as percentage of dry
        cobs_____      53.3

(d) Corn cobs with ammonium sulfate and sodium
      phosphate as nutrient and with malt corn mash
      waste in place of water
      Products per liter calculated as cellulose___ 36.6
      Acetic acid yield as percentage of dry cobs_  26.5
      Butyric acid yield as percentage of dry cobs_  6.1
      Alcohol yield as percentage of dry cobs____  11.8
      Cellulose equivalent as percentage of dry
        cobs_____      56.1
```

(e) Use of butyl-acetonic fermentation slop.

A mash is made up consisting of 6.5% concentration by weight of corn cob meal of 30 mesh and finer size, using the slop resulting after the removal by distillation of the butyl alcohol, acetone and ethyl alcohol produced by the fermentation of carbohydrate or amylaceous materials. If desired, part butyl-acetonic slop and part water may be employed as the liquid medium. This mash is then inoculated with thermophilic bacteria producing acetic acid and other useful products and fermentation allowed to proceed at about 6.0° C. Sufficient sodium bicarbonate or mixtures of sodium bicarbonate and soda ash are added at the necessary intervals to maintain the hydrogen ion concentration of the fermenting mash within the limits of about pH 9 and pH 5. At the end of about seven days a yield of 33.2% of volatile acids calculated as acetic acid is obtained.

The term "cellulosic material" in this specification and claims is to be construed as including cellulose and materials containing cellulose in its various forms which can be directly fermented according to the described process and lignified celluloses such as, for example, wood or jute, which may require previous treatment to free the cellulose from combination with the lignin or to render it fermentable.

The term "thermophilic bacteria" covers those bacteria whose optimal activity in the fermentation of cellulosic material occurs at temperatures between about 50° and about 70° C.

It is also understood that the term "waste liquors" includes the distillery liquors or waste residues obtained in the production of such substances as ethyl alcohol, butyl alcohol, acetone, butyric acid, lactic acid, etc. by fermentation. The amount of the nutrient material used may be varied as required by the particular conditions.

Now having described our invention, what we claim as new and desire to secure by Letters Patent is:

1. A process for the fermentation of cellulosic material which comprises subjecting a mash containing cellulosic material to the action of thermophilic bacteria which are capable of fermenting cellulose rapidly and with high yields, controlling the acidity of the mash so that the hydrogen ion concentration is maintained within the limits pH 9 and pH 5 measured in the bulk of the mash, and effecting the necessary supply of nutrient for the thermophilic bacteria at least in part by waste liquor from the distillation step in industrial fermentation processes.

2. A process for the fermentation of cellulosic material which comprises subjecting a mash containing cellulosic material to the action of thermophilic bacteria which are capable of fermenting cellulose rapidly and with high yields, controlling the acidity of the mash so that the hydrogen ion concentration is maintained within the limits pH 9 and pH 5 measured in the bulk of the mash, and effecting the necessary supply of nutrient for the thermophilic bacteria at least in part by waste distillery slop produced in the butyl acetonic fermentation process.

3. A process for the fermentation of cellulosic material which comprises subjecting a mash containing cellulosic material to the action of thermophilic bacteria which are capable of fermenting cellulose rapidly and with high yields, controlling the acidity of the mash by the employment of means selected from the group consisting of: oxides, hydroxides, carbonates, and bicarbonates of alkaline earth metals including magnesium, followed by the addition of compounds of alkali metals which cause the formation of insoluble alkaline earth metal compounds; and effecting the necessary supply of nutrient for the thermophilic bacteria at least in part by waste liquor from the distillation step in industrial fermentation processes.

4. A process for the fermentation of cellulosic material which comprises subjecting a mash containing cellulosic material to the action of thermophilic bacteria which are capable of fermenting cellulose rapidly and with high yields, controlling the acidity of the mash by the employment of materials selected from the group consisting of oxides, hydroxides, carbonates and bicarbonates of alkali metals including ammonium, and effecting the necessary supply of nutrient for the thermophilic bacteria at least in part by waste liquor from the distillation step in industrial fermentation processes.

5. A process for the fermentation of cellulosic material which comprises subjecting a mash containing cellulosic material to the action of thermophilic bacteria which are capable of fermenting cellulose rapidly and with high yields, controlling the acidity of the mash by the employment of sodium bicarbonate, and effecting the necessary supply of nutrient for the thermophilic bacteria at least in part by waste distillery slop produced in the butyl-acetonic fermentation process.

6. In a process for the fermentation of mash containing cellulosic material by the action of thermophilic bacteria while controlling the acidity of the fermenting mash so that the hydrogen ion concentration is maintained within the limits pH 9 and pH 5 measured in the bulk of the mash, the step which comprises effecting the necessary supply of nutrient for the thermophilic bacteria at least in part by waste liquor from the distillation step in industrial fermentation processes.

7. In a process for the fermentation of mash containing cellulosic material by the action of thermophilic bacteria while controlling the acidity of the fermenting mash so that the hydrogen ion concentration is maintained within the limits pH 9 and pH 5 measured in the bulk of the mash, the step which comprises effecting the necessary supply of nutrient for the thermophilic bacteria at least in part by waste distillery slop produced in the butyl acetonic fermentation process.

8. In a process for the fermentation of mash containing cellulosic material by the aid of thermophilic bacteria while controlling the acidity of the fermenting mash so that the hydrogen ion concentration measured within the bulk of the mash is maintained within the limits pH 9 and pH 5, by the employment of means selected from the group consisting of: oxides, hydroxides, carbonates, and bicarbonates of alkaline earth metals including magnesium, followed by the addition of compounds of alkali metals which cause the formation of insoluble alkaline earth metal compounds, the step which comprises effecting the necessary supply of nutrient for the thermophilic bacteria at least in part by waste liquor from the distillation step in industrial fermentation processes.

9. In a process for the fermentation of mash containing cellulosic material by the aid of thermophilic bacteria while controlling the acidity of the fermenting mash so that the hydrogen ion concentration measured within the bulk of the mash is maintained within the limits pH 9 and pH 5, by the employment of means selected from the group consisting of: oxides, hydroxides, carbonates, and bicarbonates of alkaline earth metals including magnesium, followed by the addition of compounds of alkali metals which cause the formation of insoluble alkaline earth metal compounds, the step which comprises effecting the necessary supply of nutrient for the thermophilic bacteria at least in part by waste distillery slop produced in the butyl-acetonic fermentation process.

10. In a process for the fermentation of mash containing cellulosic material by the aid of thermophilic bacteria while controlling the acidity of the fermenting mash so that the hydrogen ion concentration measured within the bulk of the mash is maintained within the limits pH 9 and pH 5 by the employment of materials selected from the group consisting of oxides, hydroxides, carbonates and bicarbonates of alkali metals including ammonium, the step which comprises effecting the necessary supply of nutrient for the thermophilic bacteria at least in part by waste liquor from the distillation step in industrial fermentation processes.

11. In a process for the fermentation of mash containing cellulosic material by the aid of thermophilic bacteria while controlling the acidity of the fermenting mash so that the hydrogen ion concentration measured within the bulk of the mash is maintained within the limits pH 9 and pH 5 by the employment of materials selected from the group consisting of oxides, hydroxides, carbonates and bicarbonates of alkali metals including ammonium, the step which comprises effecting the necessary supply of nutrient for the thermophilic bacteria at least in part by waste distillery slop produced in the butyl-acetonic fermentation process.

12. In a process for the production of fatty acids by the aid of thermophilic bacteria while controlling the acidity of the fermenting mash so that the hydrogen ion concentration measured within the bulk of the mash is maintained within the limits pH 9 and pH 5 by the employment of a carbonic acid salt of sodium, the step which comprises effecting the necessary supply of nutrient for the thermophilic bacteria at least in part by waste liquors from the distillation step in industrial fermentation processes.

13. In a process for the production of fatty acids by the aid of thermophilic bacteria while controlling the acidity of the fermenting mash so that the hydrogen ion concentration measured within the bulk of the mash is maintained within the limits pH 9 and pH 5 by the employment of a carbonic acid salt of sodium, the step which comprises effecting the necessary supply of nutrient for the thermophilic bacteria at least in part by waste distillery slop produced in the butyl-acetonic fermentation process.

In testimony whereof we have signed our names to this specification.

HERBERT LANGWELL.
ELOI RICARD.